United States Patent
Sharfman et al.

(10) Patent No.: US 10,454,906 B1
(45) Date of Patent: Oct. 22, 2019

(54) SYSTEMS AND METHODS FOR ENCRYPTION AND AUTHENTICATION

(71) Applicant: RE FormsNet, LLC, Los Angeles, CA (US)

(72) Inventors: Joshua D. J. Sharfman, Los Angeles, CA (US); Mourad Zerroug, Pasadena, CA (US)

(73) Assignee: RE FormsNet, LLC, Los Angeles, CA (US)

( * ) Notice: Subject to any disclaimer, the term of this patent is extended or adjusted under 35 U.S.C. 154(b) by 0 days.

(21) Appl. No.: 16/263,815

(22) Filed: Jan. 31, 2019

(51) Int. Cl.
| | |
|---|---|
| G06F 12/14 | (2006.01) |
| H04L 29/06 | (2006.01) |
| G06F 17/24 | (2006.01) |
| G06F 21/62 | (2013.01) |

(52) U.S. Cl.
CPC ........ H04L 63/0428 (2013.01); G06F 17/243 (2013.01); G06F 21/6209 (2013.01)

(58) Field of Classification Search
None
See application file for complete search history.

(56) References Cited

U.S. PATENT DOCUMENTS

| | | | | |
|---|---|---|---|---|
| 7,412,605 | B2 * | 8/2008 | Raley | ...................... G06F 21/10 380/28 |
| 2005/0062998 | A1 | 3/2005 | Kumashio | |
| 2005/0289639 | A1 | 12/2005 | Leugn | |
| 2009/0080647 | A1 | 3/2009 | Mantin et al. | |
| 2009/0116643 | A1 | 5/2009 | Hatano et al. | |
| 2009/0323950 | A1 | 12/2009 | Nakagata et al. | |
| 2010/0017615 | A1 * | 1/2010 | Boesgaard Sorensen | ................... G06F 21/55 713/176 |
| 2010/0174689 | A1 | 7/2010 | Maeda | |
| 2014/0101775 | A1 | 4/2014 | Cheung et al. | |
| 2014/0304505 | A1 | 10/2014 | Dawson | |
| 2015/0121063 | A1 | 4/2015 | Maller et al. | |
| 2015/0379286 | A1 | 12/2015 | Nordback | |
| 2016/0308840 | A1 | 10/2016 | Munshi et al. | |
| 2017/0302458 | A1 * | 10/2017 | Berger | ................ G06F 21/6218 |

* cited by examiner

*Primary Examiner* — Brandon S Hoffman
(74) *Attorney, Agent, or Firm* — Knobbe, Martens, Olson & Bear LLP

(57) ABSTRACT

Systems and methods for encryption and authentication are disclosed. A system receives a document request over a network from a first computer system, the document comprising a plurality of fields configured to receive input data. The document is transmitted to the first computer system. Context data and the document, including field input data, are received from the first computer system. An encryption key is generated and used to encrypt the document field input data and the context data. A payload is generated including the encrypted document field input data, the encrypted context data, and a non-encrypted identifier linked to the key. The payload and an image of the document are provided to a second computer system. The document image is viewable using a portable document format viewer. A decryption key request including the identifier linked to the key is received. The decryption key is provided to the second computer system to decrypt the encrypted field input data and the encrypted context data.

30 Claims, 12 Drawing Sheets

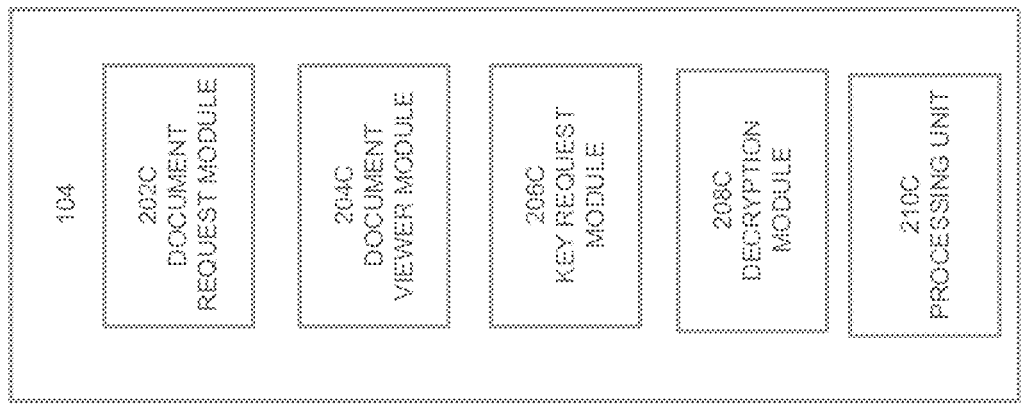

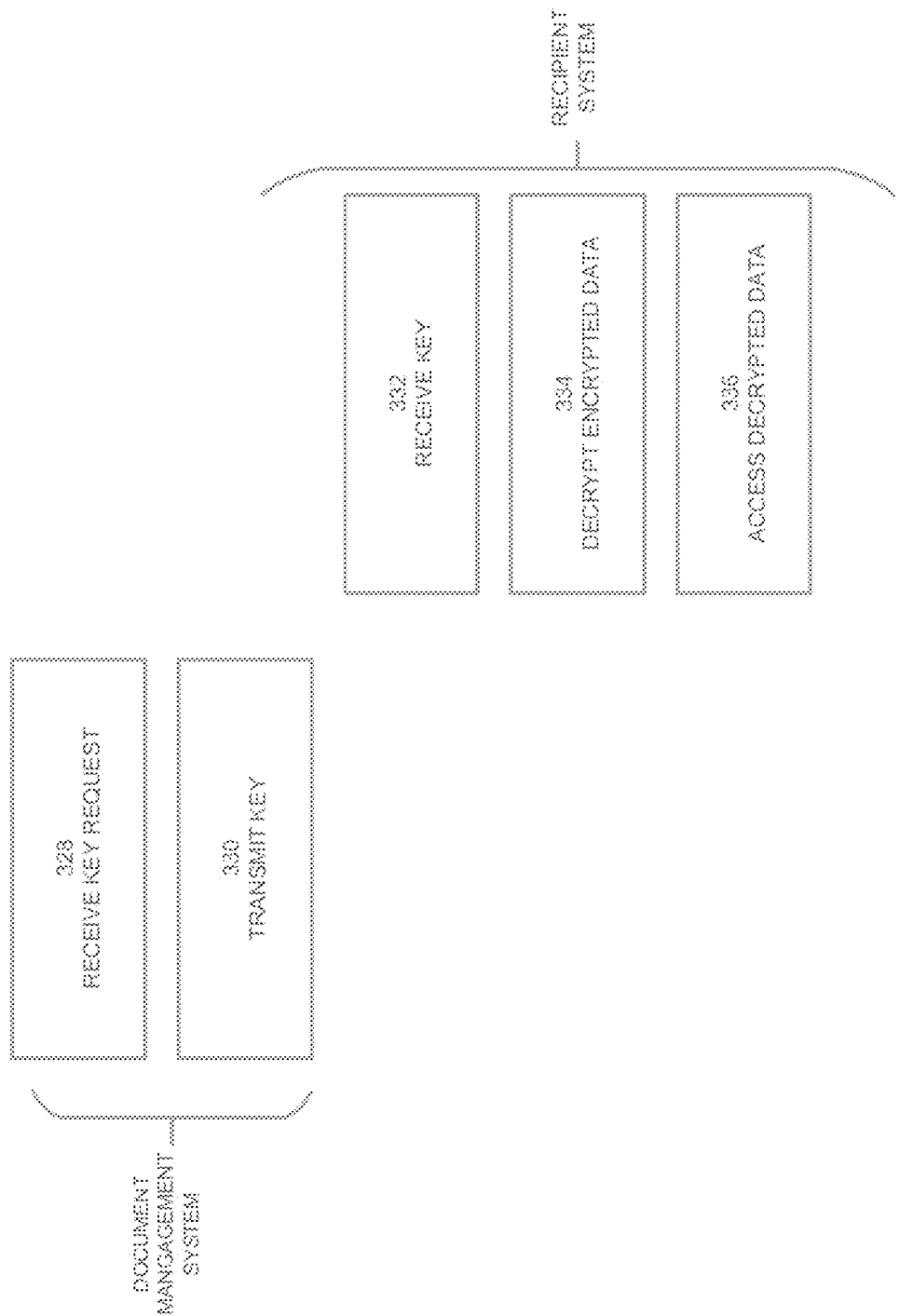

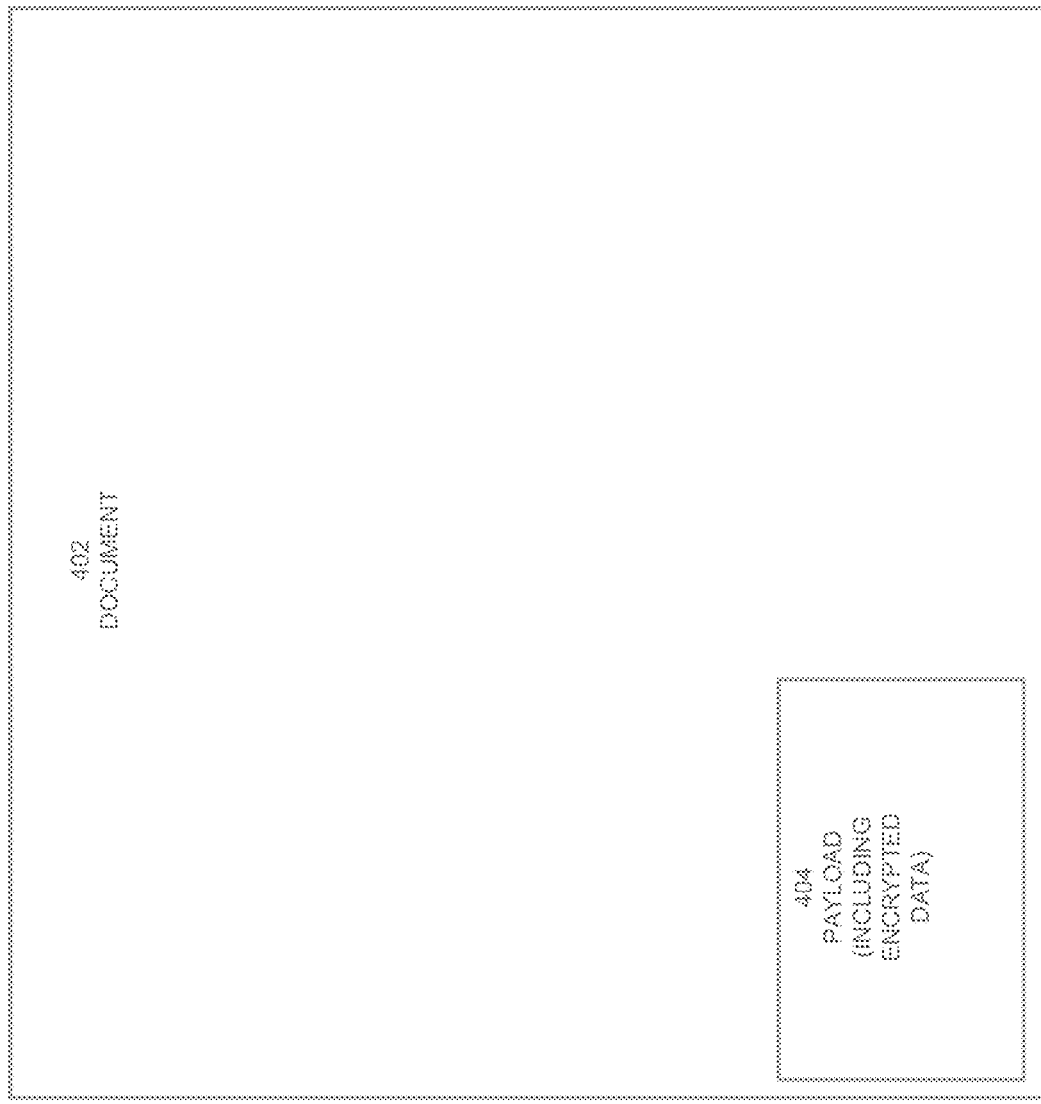

SYSTEMS AND METHODS FOR ENCRYPTION AND AUTHENTICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure relates to network and data security.

Description of the Related Art

The transfer of data (which may be embedded in electronic documents) over a network is an integral part of modern communications and technical processes. However, such data is vulnerable to interception. The improper access and use of certain sensitive data can have an adverse impact on the owners or proper users of the data. Further, intercepted data from a sender intended for a recipient may be improperly modified and the modified data may then be sent to the recipient without the knowledge of either the sender or the recipient. Such modified data may result in adverse consequences to the sender and/or the recipient.

Still further, sometimes data is in image or paper form, making the data difficulty to extract, process, and utilize. Yet further, transferring data from images or paper to computer-readable form is susceptible to errors, which may propagate through the receiving system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed herein are systems and methods for encrypting data associated with an electronic document (e.g., a form having data fields). The encrypted data may be provided to a recipient system via an electronic document that may optionally be compatible with the Portable Document Format (PDF) standard. Thus, a familiar electronic document type, such as a PDF form, may advantageously be utilized as a carrier for encrypted data (including context data) piggybacked thereon. In addition, disclosed herein are systems and methods for authenticating a user and an instantiation of an application.

An aspect of the disclosure relates to a system that receives a document request over a network from a first computer system, the document comprising a plurality of fields configured to receive input data. The document is transmitted to the first computer system. Context data and the document, including field input data, are received from the first computer system. An encryption key is generated and used to encrypt the document field input data and the context data. A payload is generated including the encrypted document field input data, the encrypted context data, and a non-encrypted identifier linked to the key. The payload and an image of the document are provided to a second computer system. The document image is viewable using a portable document format viewer. Optionally, a decryption key request including the identifier linked to the key is received. The decryption key is provided to the second computer system to decrypt the encrypted field input data and the encrypted context data.

An aspect of the disclosure relates to an authentication and encryption computer system, the authentication and encryption computer system comprising: one or more processing devices; a network interface; non-transitory memory that stores instructions that when executed by the one or more processing devices are configured to cause the computer system to perform operations comprising: perform an authentication using at least an identifier associated with an instantiation of a first application hosted on a first user computer system associated with a first user; receive a request for a first document over a network via the network interface from the first application hosted on the first user computer system, the first document comprising a plurality of fields configured to receive input data and comprising static text; provide, over the network via the network interface, the first document to the first application hosted on the first user computer system; receive from the first application hosted on the first user computer system: the first document including field input data, wherein the field input data is associated with respective field identifiers, and context data, the context data comprising textual data separate from data of the first document; generate an encryption key; encrypt: the document field input data and respective field identifiers as name-field input data sets, wherein at least a portion of the static data is excluded from encryption, and the context data; receive an indication that a Portable Document Format of the first document is to be provided to a second user computer system, the Portable Document Format including respective depictions of the field input data; provide a Portable Document Format of the first document comprising a payload to the second user computer system, the payload file comprising the encrypted name-field input data sets, the encrypted context data, and a non-encrypted identifier assigned to the first document and/or a non-encrypted identifier assigned to a transaction associated with the first document, wherein the Portable Document Format of the first document is viewable using a standard Portable Document Format viewer; receive a request for a key to decrypt the encrypted name-field input data sets and the encrypted context data; provide the key to decrypt the encrypted name-field input data sets and the encrypted context data, wherein the decrypted name-field input data sets and the decrypted context data are viewable using the standard Portable Document Format viewer and/or are computer readable as plaintext.

An aspect of the disclosure relates to a system comprising: one or more processing devices; a network interface; non-transitory memory that stores instructions that when executed by the one or more processing devices are configured to cause the computer system to perform operations comprising: authenticate a first user, the first user accessing the system using first user computer system; provide a first document over a network via the network interface to a first application hosted on the first user computer system, the first document comprising a plurality of fields configured to receive input data and comprising static text; receive from the first application hosted on the first user computer system: the first document including field input data, wherein the field input data is associated with respective field identifiers, and context data, the context data comprising textual data separate from data of the first document; generate an encryption key; encrypt: the document field input data, and the context data; enable a Portable Document Format of the first document to be provided to a second user computer system, the portable Document Format of the first document comprising a payload file, the payload file comprising the encrypted document field input data, the encrypted context data, and an item of non-encrypted text associated with the key, wherein the Portable Document Format of the first document is viewable using a standard Portable Document Format viewer; receive a request for a key, the request comprising the item of non-encrypted text associated with the key included in the payload; use the item of non-encrypted text associated with the key included in the payload to provide the key to the second user computer system, the key configured to decrypt the encrypted field input data and the encrypted context data, wherein the decrypted field input data is viewable using the standard Portable Document Format viewer and/or is computer readable as plaintext.

An aspect of the disclosure relates to a computer-implemented method comprising: providing a first document over a network to a first user computer system, the first document comprising a plurality of fields configured to receive input data and comprising static text; receiving from the first user computer system: the first document including field input data, wherein the field input data is associated with respective field identifiers, and context data, the context data comprising textual data separate from data of the first document; generating an encryption key; encrypting: the document field input data, and the context data; enabling a payload and an Portable Document Format of the first document to be provided to a second user computer system, the payload comprising the encrypted document field input data, the encrypted context data, and an item of non-encrypted text associated with the key, wherein the Portable Document Format of the first document is viewable using a Portable Document Format viewer; receiving a request for a key, the request comprising the identifier linked to the key; providing the key to the second user computer system, the key configured to decrypt the encrypted field input data and the encrypted context data, wherein the decrypted field input data is viewable using the Portable Document Format viewer and/or is computer readable as plaintext.

BRIEF DESCRIPTION OF THE DRAWINGS

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

FIG. 2C illustrates an example architecture of an example system used to access documents and document payloads.

FIGS. 3A-3C illustrates an example process.

FIG. 4A illustrates a document and payload

FIGS. 5A-5C illustrate example user interfaces for viewing and editing a document and data.

DETAILED DESCRIPTION

Figure 1:
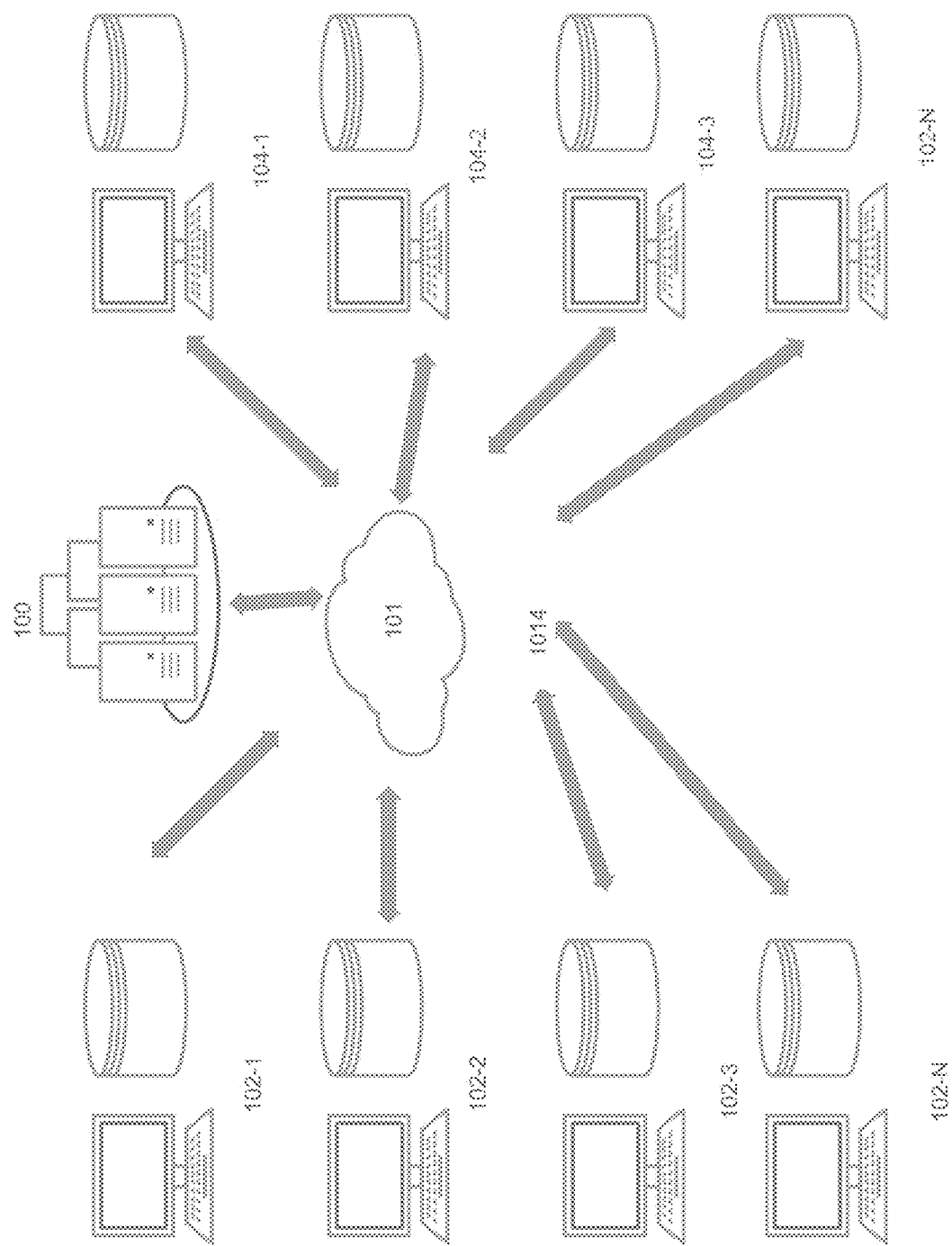
FIG. 1 illustrates an example environment.

As noted above, the transfer of data (which may be embedded in electronic documents) over a network is an integral part of modern communications and technical processes. However, such data is vulnerable to interception. The improper access and use of certain sensitive data can have an adverse impact on the owners or proper users of the data. Further, intercepted data from a sender intended for a recipient may be improperly modified and the modified data may then be sent to the recipient without the knowledge of either the sender or the recipient. Such modified data may result in adverse consequences (e.g., identity theft) to the sender and/or the recipient. Further, statutes and regulations (e.g., the California Consumer Privacy Act (CCPA), the European General Data Protection Regulation (GDPR), etc.) are increasingly being enacted to ensure data privacy of personally identifying information (PII) and Sensitive Personal Information (SPI). The failure to adequately maintain the privacy of such information may result in adverse legal consequences as well as in a reduction is user trust.

Still further, certain documents (e.g., completed forms) may be sent as a non-searchable image (e.g., to make it more difficult for the document to be tampered with), where the document text cannot be easily interpreted or processed (e.g., as a JPG, TIFF, etc.) and cannot be rendered by a document reader as a plain text file. However, while sending a document as an image may provide certain advantages, the recipient of such a document image is also inhibited from processing the document text, and may need to resort to Optical Character Recognition (OCR) in order to extract the document text for further processing. Disadvantageously, the OCR process may consume significant amounts of processing bandwidth as well as memory, and often results in character and word recognition errors. Attempts to further process such erroneous OCR results may cause still further errors and may require system intensive processes to rectify.

Disclosed herein are systems and methods that may be used to overcome some or all of the foregoing deficiencies in conventional technologies.

Certain example implementations will now be described with reference to form documents. However, the disclosed systems and methods may be utilized for other types of data and documents.

Systems and methods are disclosed that are configured to encrypt data associated with an electronic document (e.g., a form having data fields) and provide such data to a user system in a payload associated with the document. For example, the electronic document provided to the user system may optionally be compatible with the Portable Document Format (PDF) standard. Further, the electronic document, including the encrypted data payloads, may be self-contained and self-descriptive from a data perspective. The payload may include data input into the form fields (sometimes referred to herein as form field data).

By way of illustration, when the document is a form comprising form fields, the data contained in the fields (e.g., data provided by a user or a program filling out the form fields) is now available via the payload in machine-readable form, where the form field data may be encrypted. Further, certain context data that provides context for the field data (but they may not be present in the field data) or the document as a whole may be included in the payload in encrypted form, optionally with still additional unencrypted useful data. Thus, a familiar electronic document, such as a PDF form, may advantageously be utilized as a carrier for encrypted data (including context data) piggybacked thereon. Further, the electronic document may be read using a standard corresponding document reader rather than needing a customized or special purpose reader, or requiring programming by recipient entities to acquire the data in the document.

Thus, the document and payload may be accessed by arbitrary systems using standard third party readers (e.g., ADOBE ACROBAT READER) that are likely already installed on such systems and without requiring a new transport or access mechanism on the systems of users accessing the payload. Still further, user privacy is enhanced as the entered form field data may only be decrypted by an authorized user who is entitled to and has permission to access the form field data.

A given electronic document may be a standardized electronic form used for certain transactions that include security-sensitive data. By way of example, a form may be a real estate loan form, a deed of trust form, a medical insurance form, and/or the like, that includes sensitive financial data, personal data (e.g., personally identifying information, family data, relationship data, etc.), and/or medical data.

A given form field may be self-defining. The form fields and related data may optionally be stored in the payload as name-field value tuples to enhance computer generation and data consumption. For example, a given name-field value pair may include a document page number (e.g., corresponding to the page number of the form where the field is positioned), field identifier (e.g., a field number), and the field value (e.g., "page 5; field #406; 550,000"). Form field data (variable data that is provided by the user) may be encrypted, and the encrypted form field data may be stored in an attachment (sometimes referred to as a payload) to a filled-out form (e.g., as an attachment to a PDF version of the form, where the PDF version of the form may comprise an image of the document that is not rendered as plain text).

The term "form field" (sometimes referred to herein as a key-in field) as used herein is not limited to fields configured to receive alphanumeric text. Examples of form field data may include text, radio button selections, checkbox status (checked or unchecked), and/or the like. In order to conserve memory for storing the attachment of encrypted data and reduce network utilization needed to transmit the attachment of encrypted data, certain types of document data, such as boiler plate form text (e.g., instructions, predefined fixed text associated with the form fields, terms and condition, etc.), is optionally not encrypted or stored in the attachment. Optionally, non-encrypted data may be stored in one or more attachments in association with the encrypted data, and such non-encrypted data may be used in determining which key to use to decrypt the encrypted data, as well as in determination process, route, and store the document, form field data, and are attachment data. Optionally, when there are multiple attachments, each attachment may be associated with different encryption and/or decryption keys, or the same encryption and/or decryption key may be associated with multiple (e.g., all) attachments. Optionally, a payload may include different identified sections. Optionally, the entire payload may be decrypted for a given user or only specific subsets or sections of the payload may be decrypted.

Optionally, as will be discussed in greater detail herein, form field data for a given electronic form may be selectively encrypted, where field data designated as sensitive (e.g., via a field to sensitivity mapping) may be encrypted for storage, transmission, and display, and non-sensitive or public form field data may be stored in the attachment in an unencrypted form (e.g., in plain text). For example, it may be desirable to encrypt a social security number but not a checkmark indicating that the user has reviewed certain standard terms and conditions. Optionally, different keys may be associated with different fields, where different users may be granted access to different sets of keys associated with the document.

Certain data may be associated with the form to provide context for the form data (where context data may form a subset of what is sometimes referred to herein as global data, where global data may also comprise user key-in data). However, such context data may not be presented by or in the form itself, and may instead be provided in conjunction with, but not as part of the form. Optionally, such context data may not be visibly presented at all. For example, certain context data may be used by a processing module to determine how to process, route and/or store the electronic form. Optionally, some or all of the context data may be both presented to a user and may be used in determining how to process, route and/or store the electronic form (or data included therein). Optionally, certain data may appear as both field data and global data. For example, in a real estate transaction, the agent's name may appear in the context data for each transaction document, and may also appear in a field in some, but not all, the transaction documents. When there are multiple documents associated with a given transaction, some of the context data may be the same for each document, and some context data (e.g., a document creation timestamp) may be different for different documents.

Further, optionally when a user is accessing an electronic form for viewing, the form and/or context data is selected and formatted so that only a portion of the electronic form and/or context data is presented to the user. For example, the presented data may be selected for presentation based on permissions or the job function associated with the user. This process provides certain technical advantages in that sensitive, encrypted data is not presented to a user that is not authorized to view the data. Further, by inhibiting the display of data that may not be relevant or of interest to a given user, more display space is available for the display data that is relevant or of interest to the user. Thus, a user will not need to navigate, scroll, or drill down through many pages of a form in order to view the data of interest.

The selective encryption of data, such as the encryption of form field data, may be performed using symmetrical encryption and/or asymmetrical encryption. For example, where symmetrical encryption is utilized, the same cipher (e.g., a private key) may be used for both encryption and decryption. The key may be used to transform the plain text form data to encrypted data (ciphertext). The key may then be used to transform the ciphertext back to plaintext for display and/or processing. Optionally, block encryption may be used, such as Twofish, Serpent, RFC 2898, AES-256, Blowfish, CASTS, Kuznyechik, RC4, DES, 3DES, Skipjack, or other symmetric encryption algorithm. The key may be utilized by the system generating the key to decrypt the encrypted form field and/or context data. In addition or instead, the key may be provided to a recipient system, which can then perform the decryption. Providing the key to the recipient system advantageously enables distributed decryption of documents to be performed, reducing the possibility of a single point failure making all the encrypted documents un-decryptable. Further, such distributed decryption of documents may enhance the speed of decryption, while reducing the need for centralized processing, memory, and transport.

If the key is provided to another system, the key may be securely provided by and/or relayed by a trusted third party system. The key may be provided via a Public Key Infrastructure (PKI) using the Diffie-Hellman (DH) key exchange protocol. Optionally, a message authentication code is added to the ciphertext, which enables detection by the recipient of changes to the ciphertext. Optionally, the message authentication code (e.g., a cipher block chaining message authentication code (CBC-MAC)) may be generated from the private key. By way of example, the document may be coupled with a PKI signature, making the document non-reputable and tamper-evident (e.g., in terms of the visible information and the data representations).

As noted above, optionally asymmetrical encryption is used, where different keys are used to encrypt and decrypt data. The recipient's public key may be used to selectively encrypt the form and/or context data. The recipient system may then decrypt the encrypted data using the recipient's private key to transform the ciphertext back to plaintext. A certificate authority system may be utilized to certify ownership of key tuples.

Optionally, both symmetric and asymmetric encryption may be used for enhanced security. For example, in a first pass, symmetric encryption may be performed using a private key. In a second pass, asymmetric encryption may be performed using a public key. Then, when the data is received by the recipient, the asymmetric encryption private key may be used to perform a first stage of decryption in a first pass, and the symmetric encryption private key may be used perform a second stage of decryption in a second pass to thereby render the plaintext.

Optionally, different sets of encrypted data may be associated with different decryption keys, and certain recipients (or certain users at a given recipient) may be permitted to access decryption keys for certain sets of data, and not permitted to access other decryption keys for other sets of data. Thus, certain users may be able to decrypt and access (e.g., view, process, etc.) certain sets of data and not others. This enables certain data sets (e.g., social security number, medical test results, etc.) to be accessible to only those recipients or users with a need to know and/or with appropriate authority. Optionally, a user (e.g., a manager) may be granted access to all the decryption keys for all the sets of data, and so be permitted to decrypted and access all the encrypted data. Where asymmetrical encryption is used, then in addition different encryption keys may be used for different sets of data.

Thus, an electronic standardized document, that had been used to collect and transfer data in a non-secure manner, may be transformed into a carrier of encrypted sensitive data.

Optionally, a given electronic form and payload of encrypted data may be transmitted from the provider to the recipient, without having to traverse a server performing encryption services on the electronic form. As discussed elsewhere herein, this process advantageously reduces processing loads and network bandwidth loads that would otherwise be incurred by a having to make decryption calls to a central server. Further, rather than having a central server with sufficient processing power, memory, and network bandwidth to decrypt large numbers of encrypted documents (e.g., hundreds of thousands, or millions of documents a day), the decryption function is distributed among the recipients' computer systems. Yet further, by having the documents decrypted locally on the recipients' computer system, rather than stored and decrypted on a central server, document security is enhanced as there is not a single point of potential failure.

Form editing and completion will now be described. Optionally, a user system may access a given blank electronic form from a document management system (e.g., by selecting a desired form from a menu of forms). An application hosted on the user system may be utilized to fill in the form fields (e.g., text fields, checkboxes, radio button activation, etc.). The form, form field data, and/context data may be received by and stored on the document management system. The document management system may generate a document identifier and a transaction identifier (where a transaction may include one or more associated documents, such as one or more forms). As discussed above, the document management system may generate a unique encryption key (e.g., using the document identifier and/or transaction identifier). The document management system may use the key to encrypt certain data from the form (e.g., form field data) and certain context data, and not other data (e.g., static text, such as boilerplate text, terms and conditions, etc. that are not input by the user). The encrypted data and optionally certain non-encrypted plaintext data (e.g., the document identifier, the transaction identifier, and/or a time stamp) may be stored in a file. Optionally, certain data may be encoded in a computer-readable optical code (e.g., a QR code, other barcode, geometrical figures, and/or other non-text code). For example, the document identifier, the transaction identifier, and/or a time stamp may optionally be encoded into one or more of the optical codes. Optionally, certain data may be encrypted prior to being encoded into an optical code. The data encoded in an optical code may be read and converted into plaintext for further use or processing. For example, a user may print out the file (including the optically-coded data). The optically coded data may be scanned (e.g., using a dedicated laser scanner or using a camera such as may be found on a computer or smart phone).

A recipient, via a recipient system, may then access the form and the file (e.g., as a payload attachment to the form). The form may be accessed in an image format, where the form is not in plaintext (and is not searchable or editable without performing an OCR operation or the like). In addition, the recipient system may access the key (e.g., by activating a link to the key included in the attached file, by scanning an optical code, such as a QR or other barcode, that encodes a link to the key, by transmitting a transaction identifier to the document management system, or the like). The recipient system may then use the key to decrypt the file. As discussed elsewhere herein, optionally a token may need to be provided in order to access the key. The decrypted data from the payload file may then be used to process, route, and/or store the form and/or the data included in the file. As similarly discussed above, by having the documents decrypted locally on the recipients' computer system, rather than stored and decrypted on a central server, document security is enhanced as there is not a single point of potential failure.

Optionally, when a recipient receives a document including encrypted data, the user may provide a viewing instruction via the user terminal (e.g., by clicking on an icon corresponding to the document, by selecting the document from a list of documents, by clicking on an "open" control, or otherwise). A link included in the payload file may be provided for display to the recipient. The recipient may click on the link and at least partly in response, the document management system may transmit the key to the recipient system. The recipient system may then decrypt the payload file data.

Optionally, a given attached payload file may be associated with a single document or with a plurality of documents associated with the same transaction. For example, a transaction involving the sale of an item of real estate may involve multiple documents, such as buyer's agent agreement, purchase agreement, addenda, amendments, riders, seller disclosures, home inspection report, closing disclosure, title insurance policy, property deed, and/or the like. Optionally, the same key may be used to encrypt data (e.g., form field data, context data, etc.) associated with multiple documents that are part of the same transaction.

The file may be provided to the recipient system via JSON, XML, CSV, DAAS, or other format. Optionally, the recipient may need to transfer one or more tokens (which may correspond to a payment) to the operator of the document management system or other decryption service provider in exchange for the decryption key (where a given key may be associated with documents/files of a corresponding transaction).

For example, optionally the recipient may acquire (e.g., for a fee) one or more tokens for use in acquiring decryption keys. By way of illustration, a given recipient may elect to purchase a token on a document-by-document basis, or may elect to purchase a large number of tokens (optionally in response to an inducement, such as a discounted price based on quantity). Optionally, the recipient may subscribe to a decryption service (e.g., with a periodic payment, such as a monthly or yearly payment) entitling the recipient to a limited number of document or transaction decryptions, or an unlimited number of document or transaction decryptions. Optionally, the recipient may request multiple keys in batch mode via a web service or may request multiple keys via an interactive web session. For example, the recipient may transmit the appropriate transaction identifiers (e.g., as plaintext, as optical codes, or as plaintext decoded from optical or other non-text code) for a plurality of transactions to the document management system, and in return receive the corresponding decryption keys (where the keys may be provided in association with the corresponding transaction identifier to enable the recipient system to correctly apply a given key to corresponding transaction documents).

Because the electronic form is optionally self-contained as a machine readable document (including the form content and the context data, as selectively encrypted), network bandwidth utilization is reduced, as calls do not need to be made by the receiving system over a network to request additional form-related data. Further, the recipient system does not have to utilize processing resources to access, format, and assemble data from multiple sources in order to provide the recipient with the relevant data. In addition, the possibility of data transposition errors is greatly reduced or eliminated, thereby providing more robust data communications. Still further, because the electronic form is self-contained data drift is avoided, as might otherwise occur if the form-related data were accessed from multiple sources. Indeed, because the form field data and context data are written at the same time that the document is generated, the data payload is guaranteed to be identical to the data (e.g., field data) in the document and to the original context data. Similarly, the global field context data encoded into the document will also be identical to the state of the global field context data at the time the document was generated.

Optionally, rather than having the recipient system perform the decryption, another system (e.g., the document management system) may perform the decryption. Optionally, if the recipient system receives documents and respective attached payload files in encrypted form, the recipient may upload the documents and payload files (or just the files) in batch mode to a system (e.g., the document management system) for decryption via a web service or the documents and payload files may be provided via an interactive web session. Advantageously, the documents and/or payload files may be uploaded and the decrypted payload data downloaded during a time the network and/or decryption system is otherwise being lightly utilized (e.g., between 11 AM and 5 AM) to ensure that the network and decryption system are not overloaded. Optionally, the recipient may need to transfer one or more tokens (which may correspond to a payment) to the operator of the system performing the decryption in exchange for the decryption service as described above.

Optionally, the encrypted payload (e.g., the file attachment) may be recorded on a private or public blockchain. Decryption and e-commerce services can be deployed on the blockchain. For example, a pointer to the document/file may be placed on the blockchain. A hash may be generated based on the document/file at creation time and the hash may be recorded on the blockchain in association with the pointer. Then, when the document/file is later retrieved by or on behalf of the recipient a hash may be generated based on the document/file. The hash generated at the time of creation may be retrieved from the blockchain and compared to the hash generated upon retrieval of the document. If the two hashes match, then it may be concluded that the retrieved document/file has not been improperly modified. If the two hashes do not match, then it may be concluded that the retrieved document/file has been modified since the creation hash was generated. If it is determined that the retrieved document/file has been modified, a warning notification may be generated to the recipient and optionally, the retrieved document/file data is not provided to the recipient for display. Optionally, an optical code (e.g., a one or two dimension code, such as a QR code or other barcode) or other code may be provided that encodes a link to the blockchain address for the file stored in a repository of encrypted data. The use of a blockchain may provide enhanced resiliency against the loss of one or more nodes, better ensuring the distributed data store availability.

In addition, optionally smart contracts (e.g., programs) may be deployed on the blockchain. For example, a smart contract may be configured to restrict knowledge and control over the contents and performance of the contract. By way of illustration, such smart contracts may be used to control key access, commerce, rights management (e.g., which user is provided to access what data), and/or the like.

Optionally, the payload file may be provided to a recipient without the document image. The context data and field data stored in payload file may be decrypted and used to reconstruct the image by accessing the corresponding form template/substrate, inserting the field data in the corresponding substrate fields, and displaying the result. This technique provides an efficient way of transmitting information while reducing network bandwidth and memory utilization. For example, the form substrate may be shared one time with a given recipient (where the substrate does not contain sensitive data), and subsequently only the payload files need to be transmitted to the recipient. The recipient can then access the decryption key, decrypt the encrypted payload data, and apply the decrypted payload data to the substrate to recreate the original completed document.

Certain aspect of the disclosure will now be discussed with reference to the figures.

Referring to FIG. 1, an example document management system 100 may communicate over a network 101 with a plurality of user systems 102-1 . . . 102-N and 104-1 . . . 104-N. The document management system 100 may interact with the user systems via a client server configuration. The document management system 100 may comprise a hosted computing environment that includes a collection of physical computing resources that may be remotely accessible and may be rapidly provisioned as needed (sometimes referred to as a "cloud" computing environment). The document management system 100 may also include a data store. The data store is optionally a hosted storage environment that includes a collection of physical data storage devices that may be remotely accessible and may be rapidly provisioned as needed (sometimes referred to as "cloud" storage).

The plurality of user systems 102-1 . . . 102-N and the and 104-1 . . . 104-N may include standalone computers (e.g., desktop, laptop, tablet, smart phone, or other computer device), a centralized computer system, or a cloud computing system. The user systems 102-1 . . . 102-N may be associated with users that provide information for documents (e.g., field inputs to fill in form fields), and user systems 104-1 . . . 104-N may be associated with users that access the documents and information provided by the users of the user systems 102-1 . . . 102-N and the payload file that includes encrypted data. Of course a given user may be a provider of data and also a user of data. By way of example, in the real estate context, users may include a seller of real estate, a purchaser of real estate, a real estate agent representing the purchaser, a real estate agent representing the seller, a title insurance company, a mortgage agent, a mortgage provider, a home owner insurance provider, and/or the like.

Optionally, rather than using the client-server architecture illustrated in FIG. 1, a standalone computer system may be utilized with an installed application configured to perform encryption and certain other functions described herein locally. Such standalone computer system solution may or may not connect to the system 100 for storage purposes.

Figure 2A:
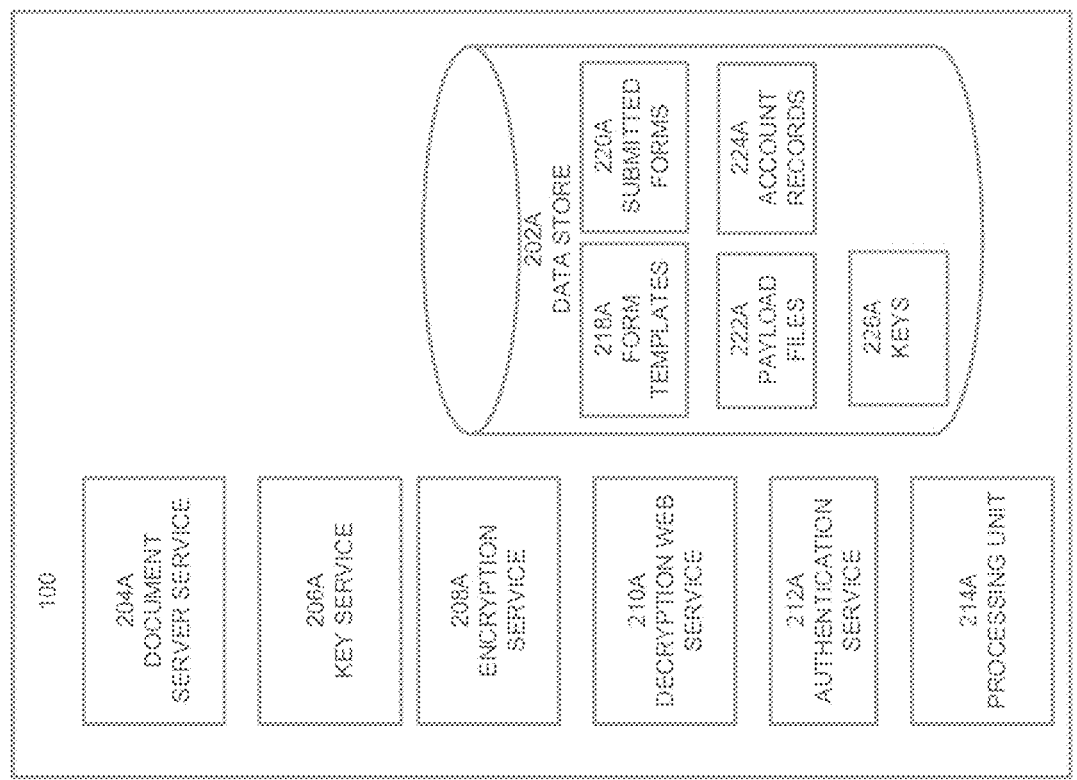
FIG. 2A illustrates an example architecture of a document management system.
Figure 2B:
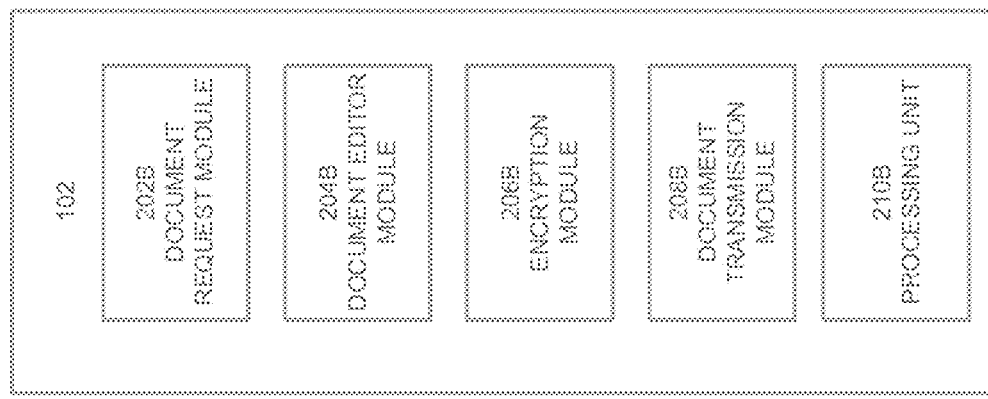
FIG. 2B illustrates an example architecture of an example system used to provide document data.

With reference to FIGS. 2A-2C, example implementations are of the document management system 100, the user system 102, and the user system 104 are illustrated. Referring to FIG. 2A, the document management system 100 may include a data store 202A (which may include multiple data stores), a document server service 204A, a key service 206A, an encryption service 208A, a decryption service 210A, and/or an authentication service 212A. A processing unit 214A is used to execute programmatic instructions stored in memory to perform the various functions discussed herein. As noted above, the document management system 100 (optionally including the data store 202A) may be cloud-based.

Thus, for example, the data store 202A may store blank forms/templates/substrates (e.g., PDF versions; form substrates with form boilerplate text/graphics and form fields, but also including enhanced properties, such as associated rules, scripts (e.g., JAVASCRIPT), and/or formulas associated with various form fields or other portions of the forms; or the like) 218A, forms filled in and submitted by users (e.g., PDF versions, image versions, etc.) 220A (sometimes referred to as completed forms, whether wholly or partially completed), payload files 222A, which may include encrypted form field data and context data (which may include encrypted data), account records 224A (which may include accounts for users, an indication as to what services they are subscribed to, document preferences, etc.), keys 226A used for encryption/decryption, and/or the like. Optionally, a given payload file may be stored together with the corresponding document or document image. Optionally, instead of or in addition to storing blank forms in the data store 202A, the system 100 may pre-generate the form substrate using a format. The pre-generated from may optionally be cached in memory and provided to a user system when requested, thereby enhancing performance with respect to the speed with which the form may be provided to the user system. Optionally, rather than store a completed form as a single document, the user provided data may be stored separately from the form substrate, and as part of a rendering process for display on a user terminal, the user provided data and the form substrate may be combined so that the user provided data appears in corresponding form fields. The data store 202A may host one or more databases in which some or all of the foregoing data is stored.

A given database may be a relational database (e.g., an SQL database) or a non-relational database (a nonSQL database, such as NoSQL). For example, a relational database may advantageously use the same uniform language (e.g., DDL) for different user roles (developer, user, administrator, etc.), may use a standardized language for different relational database management systems, may use an advanced and non-structural querying language, and may comply with ACID principles (atomicity, consistency, isolation, durability), thus ensuring stability, security, and predictability both of the entire database and each transaction. A nonSQL database may be used rather than an SQL database as it better scales out horizontally across distributed systems and so can handle a large number of transactions (e.g., millions of transactions at a time). Further, a nonSQL database may be schema-free and so better utilized with unstructured and semi-structured data. Thus the selection of the database technology may be based on the particular use scenario (e.g., the need for stability and uniformity offered by SQL databases v. the need to process large amounts of unstructured and semi-structured data as provided by a nonSQL database).

The document server service 204A may be used to serve blank forms (e.g., PDF forms or form substrates with enhanced properties), filled-in forms, and payload files (including encrypted and plaintext data) to user systems 102 and user systems 104, as appropriate. The key service 206A may be used to generate encryption and/or decryption keys. The keys may be stored in the data store 202A. Optionally, rather than storing keys in the key data store 226A, encryption and/or decryption keys may be generated on demand thereby reducing memory utilization and enhancing security (as there is no key data store that may be breached).

The keys may be used for by the document management system 100 for the encryption of data and the decryption of data. The encryption keys may optionally be used by user systems 102 for the encryption of data and by the user systems 104 for the decryption of data, as will be discussed elsewhere herein.

The encryption service 208A may be used to encrypt data, such as context data and form field data, such as that received from users of user systems 102. The encryption service 208A may optionally be provided as a web service. The decryption service 210A may be used to perform decryption on behalf of users of user systems 104. The decryption service 210A may also verify a document and/or payload data has not been modified since their initial creation. The verification service may be performed prior to providing a document and associated file to a user system 104 or may be performed on a document and associated file uploaded by a user system 104 to the document management system 100 for decryption. Optionally, however, the user systems 104 may themselves perform decryption using keys generated by the key service 206A and accessed from the key data store 226A.

The authentication service 212A may be used to authenticate a user and/or application (such as that illustrated in FIG. 2B) on a user system 102. For example, the authentication service 212A may be configured to uniquely and securely identify an application of a user computer 102 accessing the document management system 100, and identify an associated user account, prior to granting the user system 102 with the corresponding services described herein. If the application cannot authenticate itself properly and successfully, or if the user account cannot be found or is expired, an authentication error results and an electronic notification (e.g., a generated sound, a text notification, an image notification, etc.) may be provided to the user of the user system 102 and/or an administrator of the document management system. In order to authenticate a user and application, the document management system 100 may need to receive via the user system 102 a valid shared key (a unique identifier granted to the user/account that authenticates the user's instantiation of the application hosted on user system 102), and at least one of the following username-password, user external ID (that uniquely identifies the user), biometric data that uniquely identifies the user, or other type of robust identification data. Optionally, the user system 102 may also need to pass a session identifier that uniquely identifies the current interaction by the user system 102 on behalf of a specific authenticated user.

An example implementation of the user system 102 is illustrated in FIG. 2B. The user system 102 may include an application comprising a document request module 202B, a document editor module 204B, an encryption module 206B, and/or a document transmission module 208B. The various modules of user system 102 may be part of the same application hosted on the user system 102 or may be separate applications. Optionally, certain of the modules may not be included or used. A processing unit 210B is used to execute programmatic instructions stored in memory to perform the various functions discussed herein.

The document request module 202B may be used to render a user interface presenting a list of available blank forms (or other documents) available from the document management system 100. The list may be periodically refreshed based on data from the document management system 100 (e.g., information about the requester to determine the entitlements that the requester has at the time the request was made given other reference data/attributes associated with that user/application/requester) to ensure the latest available forms are listed. Such updated list ensures that an old form or inappropriate form is not inadvertently used.

The rendered user interface may also display forms (or other documents) that had previously been edited by the user and stored on the document management system 100 and/or on the user system 102. The user may select a listed form (or other document) which may then be downloaded or otherwise accessed by the user system 102 from the document management system 100. Scripts, rules, and/or formulas associated with various form fields or other portions of the forms may likewise be accessed.

The document editor module 204B may be used to view and edit documents accessed from the document management system 100, enter form field data, select/unselect checkboxes, select radio buttons or other controls associated with the document, and/or the like. The documents may be PDF documents or form substrates with enhanced features, such as executable scripts, rules, and/or formulas associated with one or more fields. Optionally, the form substrate is in a proprietary format that is not PDF-complaint or renderable by a standard PDF viewer, but is renderable by a viewer specifically designed to read and render the proprietary format (e.g., the document editor module 204B). The document editor module 204B may also execute scripts, rules, and/or formulas associated with various form fields (e.g., that may be included in a form substrate).

For example, certain scripts may be used to prevent improper data types from being entered into a given field (e.g., prevent an alphabetic entry into a field intended to receive a numerical entry, or vice versa). By way of further example, certain formulas may be used to calculate various financial values (e.g., a mortgage calculator) or other values. Optionally, certain scripts, rules, and/or formulas associated with a substrate may be selectively executed by the user computer 102, and certain scripts, rules, and/or formulas associated with the substrate may be selectively executed by the document management system 100. For example, the user computer 102 (e.g., via the editor module 204B) may perform calculations using formulas or field data translations from numbers to corresponding alphabetic text (e.g., from 1,000,000 to one million) using a substrate script. In addition, the document management system 100 may receive a notification from the user computer 102 (e.g., via the document editor module 204B) that the user has activated a given radio button or checked a checkbox (or other interface), and in response the document management system 100 may determine that additional documents related to a transaction are to be downloaded to the user computer 102 and initiates such download.

The document editor module 204B may enable the user to select different views of the document. For example, a first selectable view may be an interactive view of a form document, the view including the form boilerplate (e.g., terms and conditions, branding, etc.) and fields for which the user can enter data. A second selectable view may be an interactive view of the form document, excluding the form boilerplate and including fields for which the user can enter data. The second view may enable more key-in fields to be displayed at the same, making data entry more rapid and reducing the need to scroll through the boilerplate to reach key-in fields. A third selectable view may display field detail data for a selected form field. A fourth selectable view may provide a conversational dialog interface or other user interface that is coupled to an artificial intelligence engine. The fourth view may present questions to the user which the user may answer. The answer may then be parsed by the artificial intelligence engine, and the artificial intelligence engine may use information obtained via the parsing to populate field values.

The document transmission module 208B may be used to upload, save or otherwise provide the edited document (or just the field data in association with corresponding field identifiers) to the document management system 100.

An example implementation of the user system 104 is illustrated in FIG. 2C. The user system 104 may include document request module 202C, document viewer module 204C, key request module 206C, decryption module 208C. A processing unit 210C is used to execute programmatic instructions stored in memory to perform the various functions discussed herein.

The document request module 202C may be a downloaded application or may be a browser that accesses user interfaces served over the network by the document management system 100. The user may need to login via a login user interface in order to access documents (filled-in forms) from the document management system 100. Once logged-in, a list of documents that the user of user system 104 is entitled to access may be presented. The user of system 104 may then select a document for download or to be otherwise presented. The selected document and associated payload filed by then be downloaded or otherwise provided to the user system 104. Optionally instead, the user of user system 102 may transmit a link to the document to the user of user system 104 which may be activated (e.g., clicked on) in order to retrieve the corresponding document without having to login and/or without having to otherwise specify, locate or select the document from within a document list.

The document viewer 204C may be an application configured to view certain document types (e.g., PDF documents) that comply with certain standards and to access attached files, such as the payload files discussed herein. In addition, the document viewer 204C may be configured to access and use decryption keys to decrypt encrypted data within the payload files.

The key request module 208C may be configured to request a decryption key for one or more documents (e.g., documents associated with a transaction). The key request may be transmitted to the document management system 100 which may return the key. The key request may include a identifier accessed from the payload file that is logically linked to the key (e.g., a transaction identifier). The decryption module 208C is configured to use the key to decrypt encrypted payload data. Optionally, the key request module 208C and the decryption module 208C may be included in the document viewer 204C.

Figure 3A:
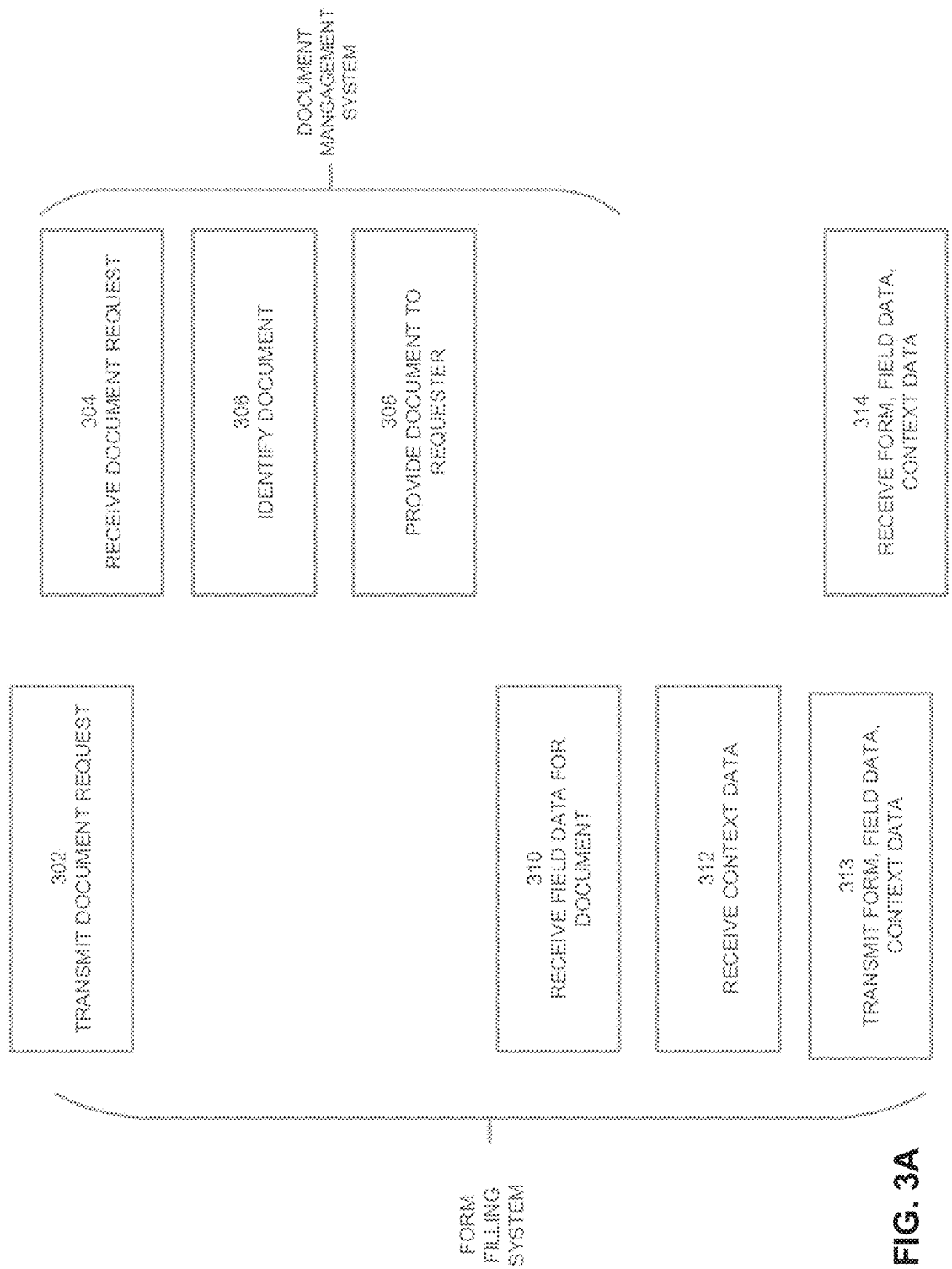
Figure 3B:
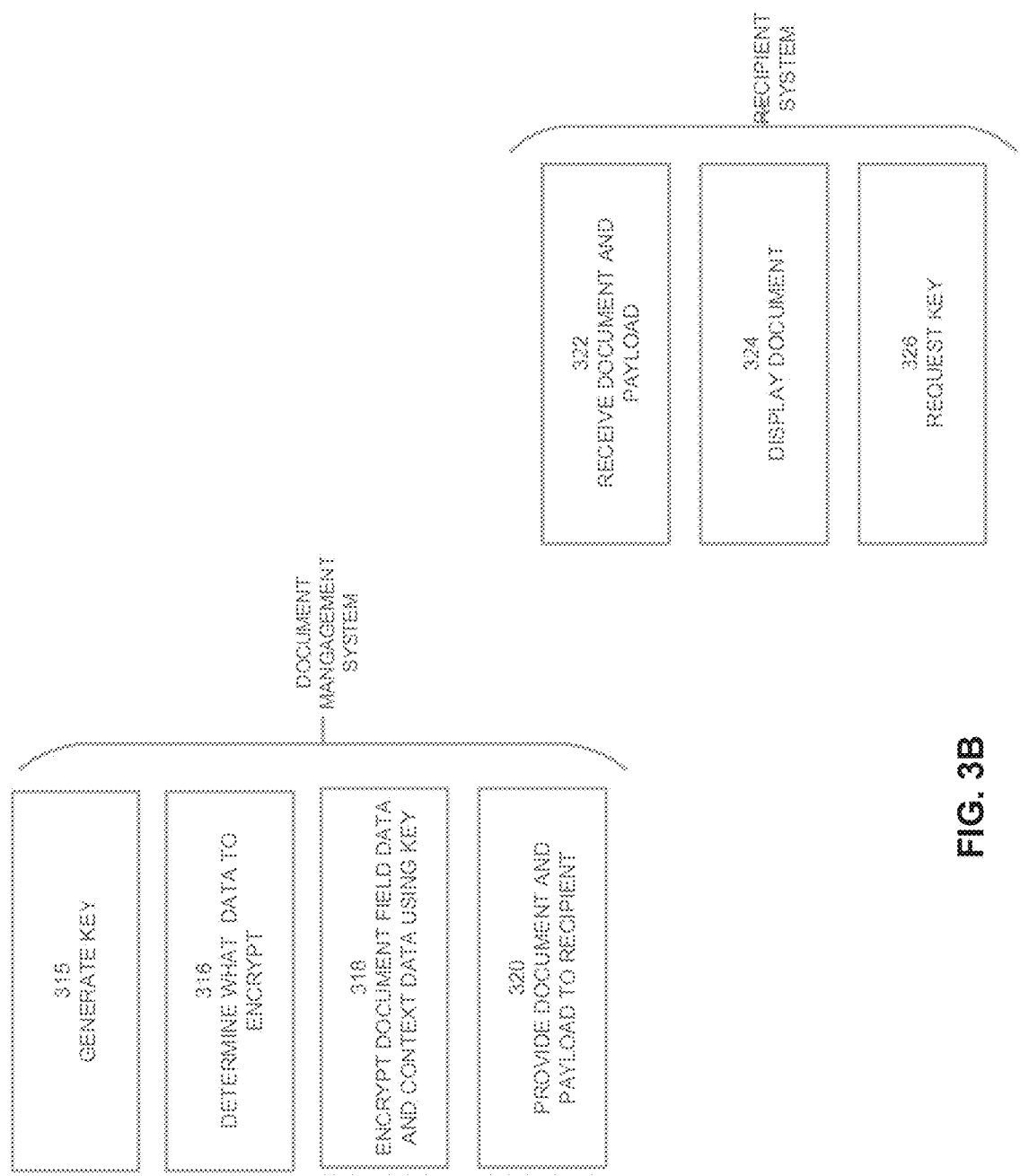

FIGS. 3A-3C illustrate an example process related to the encryption of data to accompany a document as a payload. In this example, the example document is a form with form fields to be filled in by a user, however other document types may be used. The document may be related to a real estate transaction and, by way of example, the process may be used for escrow instructions and package automation, loan origination automation, creation of a brokerage disclosure history repository, automation of leasing process to rent collection, and/or the like.

The various acts may be performed by a document management system (e.g., document management system 10), a form filling system (e.g., user system 102), and/or a document recipient system (e.g., user system 104).

At block 302, a system associated with a form filler user transmits a document request over a network to a document management system. The document request may be issued in response to the user selecting a desired form document from a menu of documents. The document request may be for a blank form, such as a form related to a real estate transaction. The document request may include a document identifier (e.g., an alphanumeric code or a link associated with the corresponding document menu selection). In addition, a transaction identifier may be associated with the document request where the document may be part of a multi-document transaction. The transaction identifier may have been previously generated by the document management system and provided to the user system 102. The user may identify what transaction the requested document is for when requesting the document or when transmitting the filled-in document back to the document management system at block 313. Optionally, as similarly discussed above, the user and application instantiated on the form filling system may be first authenticated by the document management system before providing the requested document form. For example, a shared key and unique user identifier may need to be received from the form filling system prior to the document management system providing the services of the document management system.

At block 304, the document request is received at the document management system. At block 306, the document management system uses the received document identifier to locate and access the corresponding requested document stored in a data store. At block 308, the document management system provides a copy of the requested document (e.g., via a download of the requested document to the form filling system). The document may be a PDF-format document or may be a form substrate with enhanced features as described elsewhere herein.

At block 310, the form filling system displays the downloaded document to the user and receives form field inputs (e.g., alphanumeric text, checkbox input, control activation, images, etc.) from the user. The inputs may be provided via a keyboard, stylus, touch input, voice input, or otherwise. The form filling system may record the inputs in association with the corresponding fields and may display the inputs in the corresponding fields to the user.

At block 312, the form filling system may also receive context data. The context data may provide context information for the transaction of which the document forms a part. The context data may be received via one or more of the fields of the document and stored as context data. The context data may be shared across multiple documents associated with the transaction, including the first document.

An example technique for identifying context data in a document will now be described. An application executed by the form filling system may scan the document field description text to identify form field description text indicating that the corresponding form field data value includes context data. Such a determination may be made by comparing the field description text against a library of terms corresponding to context data indicators. When a match is detected, the user entered data for the field may be identified as context data and stored as such.

With respect to a real estate transaction, context data may include some or all of the following: a property address, a listing agent name and/or other identifier, listing agent contact information, property listing date, property listing price, expiration date of listing, contract date, closing price, closing date, amount financed, school district identifier, tax ID, tax county, legal description, parcel number, subdivision, home owner association fee, seller name, seller contact information, seller attorney name, seller attorney contact information, buyer name, buyer contact information, buyer attorney name, buyer attorney contact information, appraiser name, appraiser contact information, escrow agent name, escrow agent contact information, lender name, lender contact information, lender loan number, title insurance name, title insurance contact information, property type (e.g., residential, multi-unit, vacant, commercial, etc.), name of person who completed form, contact information of person who completed form, and/or other data.

Thus, for example, if the document is a real estate transaction, the library of terms may include such terms as "property address," "listing agent name," "listing agent phone number," "listing agent address," "property listing date," "property listing price," "expiration date," "closing price," "closing date," "amount financed," "school district," "tax ID," "tax county," "legal description," "parcel number," "subdivision," "association fee," "seller name," seller phone number," "seller address," "seller attorney name," "seller attorney phone number," "seller attorney address," "buyer name," "buyer phone number," "buyer attorney name," "buyer attorney phone number," "buyer attorney address," "appraiser name," "appraiser phone number," "appraiser address," "escrow agent name," "escrow agent phone number," "escrow agent address," "lender name," "lender phone number," "lender address," "lender loan number," "title insurance name," "title insurance phone number," ""title insurance address," "property type," permutations thereof, and/or the like.

In addition or instead, the context data may be explicitly received via a context data input user interface prompting the user of the form filling system for the context data. For example, a context data input user interface may include fields corresponding to those discussed above with respect to the library of terms.

The application identifying the context data may be included in the application discussed with reference to FIG. 2B or may be downloaded in conjunction with the requested document (e.g., as a script). Similarly, the library of context terms may be downloaded from the document management system with the document or may be periodically downloaded to the form filler system and updated by the document management system.

At block 313, the form, as completed by the user of the form filling system, is transmitted over the network to the document management system (e.g., as a PDF document) in conjunction with the context data. The form may optionally be transmitted in a different format (e.g., using HTML) than the format used when the form was provided by the document management system at block 308. The form field data may be transmitted as name-field value tuples. For example, a given name-field value pair may include a corresponding document page number, field identifier (e.g., a field number), and field value. The document may be transmitted as a searchable document or as a non-searchable image file. The form filler system user may optionally identify one or more intended recipients of the form (e.g., by entering corresponding email addresses, by selecting intended recipients from a contact/recipient data store, or otherwise). Optionally, if the context data is encoded in a computer readable code (e.g., a barcode, such as a QR code, or other non-text code), the computer readable code may be scanned (e.g., from a printed version of the context data or from a displayed version of the context data), decoded, and the decoded data may be transmitted to the document management system 100.

Blocks 302-313 may be repeated with respect to additional documents for the transaction. Optionally, if multiple forms belonging to the system transaction are being provided by the user system 102 to the document management system, the multiple form may be provided to together (with their respective context data) to the document management system 100, rather than on an as-completed basis.

At block 314, the document management system receives the form, name-field value pair data, and context data.

Referring to block 315, the document management system generates an encryption key. As discussed, the key may be generated based on the transaction identifier and/or the document identifier. If the document is being added to a previously defined transaction, a previously generated key for the transaction may be accessed rather than generating a new key. If symmetrical encryption is used, the same key may be used for decryption. If asymmetrical encryption is used, different keys may be used for encryption and decryption.

At block 316, a determination is made as what document, context data, and other data is to be encrypted when generating the payload to accompany the document. For example, the payload may include descriptive text (e.g., including user instructions), a transaction identifier (as plaintext and/or as an optical code), a document identifier, a timestamp, the form name-field value data, the global/context data, and versioning data. By way of illustration, a set of rules may be accessed from memory that may be used to determine what data is to be encrypted. For example, the rules may indicate that all name-field value data is to be encrypted and that all context data is to be encrypted, but that the descriptive text, transaction identifier, document identifier, timestamp, and versioning data are not to be encrypted. By way of further example, the rules may indicate that certain sensitive name-field value data and context data (e.g., name-field value or context data that include personally identifying information, medical records, etc.) are to be encrypted and that other name-field value data and context data are not to be encrypted, and that the descriptive text, transaction identifier, document identifier, timestamp, and versioning data are not to be encrypted.

At block 318, the data is accordingly encrypted using the encryption key. The encrypted data may be stored in a file (the payload file) together with certain unencrypted, plaintext or optically-coded data (e.g., descriptive text, transaction identifier, document identifier, timestamp, and versioning data). The payload file may be stored in association with the populated form and/or an image of the populate form (where the image content cannot be searched as the content is not easily read by a computer without performing an OCR operation). The populated form and payload file may be stored in a searchable SQL or noSQL database.

At block 328, the document management system receives a request for a decryption key (which may be the same as the encryption key if symmetrical encryption is used) from a recipient system. The key may be requested via a variety of techniques. For example, the key may be accessed by the recipient system by providing the corresponding transaction identifier associated with the transaction of which the document forms a part. By way of additional example, the key may be accessed by activating a link included in the payload after receipt by the recipient system, by activating a link transmitted to the recipient system by the form filler user, by activating a link transmitted to the recipient system by the document management system, or by simply requesting the populated form from the document management system.

By way of illustration, the recipient system may have received the non-searchable image of the populated form (e.g., as a PDF file) and the payload file from the form filler system user (e.g., via email or a third party file hosting system). Optionally instead, the recipient system may have downloaded the image of the populated form and the payload file from the document management system. For example, the recipient may access a web service of the document management system, login to the system, and the system will display, via a corresponding user interface, the documents available for download by the recipient to the recipient system.

The document viewer (e.g., a PDF viewer) may display the PDF document and may display (automatically or in response to a user activation of a corresponding control) some or all of the unencrypted data stored in the payload file. The viewer may display a link (e.g., included in the payload file in unencrypted form) to the key. In response to the user activating the link (which may be a universal resource locator pointing to the key location), the key may be retrieved and downloaded to the recipient system.

At block 328, the document management system receives the key request. At block 330, the document management system accesses and transmits the key to the recipient system. As discussed elsewhere herein, optionally, rather than transmitting the key to the recipient system so that the recipient system can decrypt the encrypted payload data, the document management system may access and decrypt the encrypted payload data, and provide the payload file with the decrypted data to the recipient system.

At block 332, the recipient system receives the key. At block 334, the recipient system (e.g., via the viewer) may use the key to decrypt the encrypted data in the payload. At block 336, the decrypted data may be displayed and/or otherwise utilized and processed by the recipient system or another system (e.g., used to populate a database of the recipient system).

Optionally, if the

FIG. 4A illustrates an example document 402 and the associated payload 404 provided to a recipient system. As discussed above, the document 402 may optionally be a completed PDF form in an image format. The payload 404 may include encrypted data (e.g., global data) and unencrypted data.

Figure 4B:
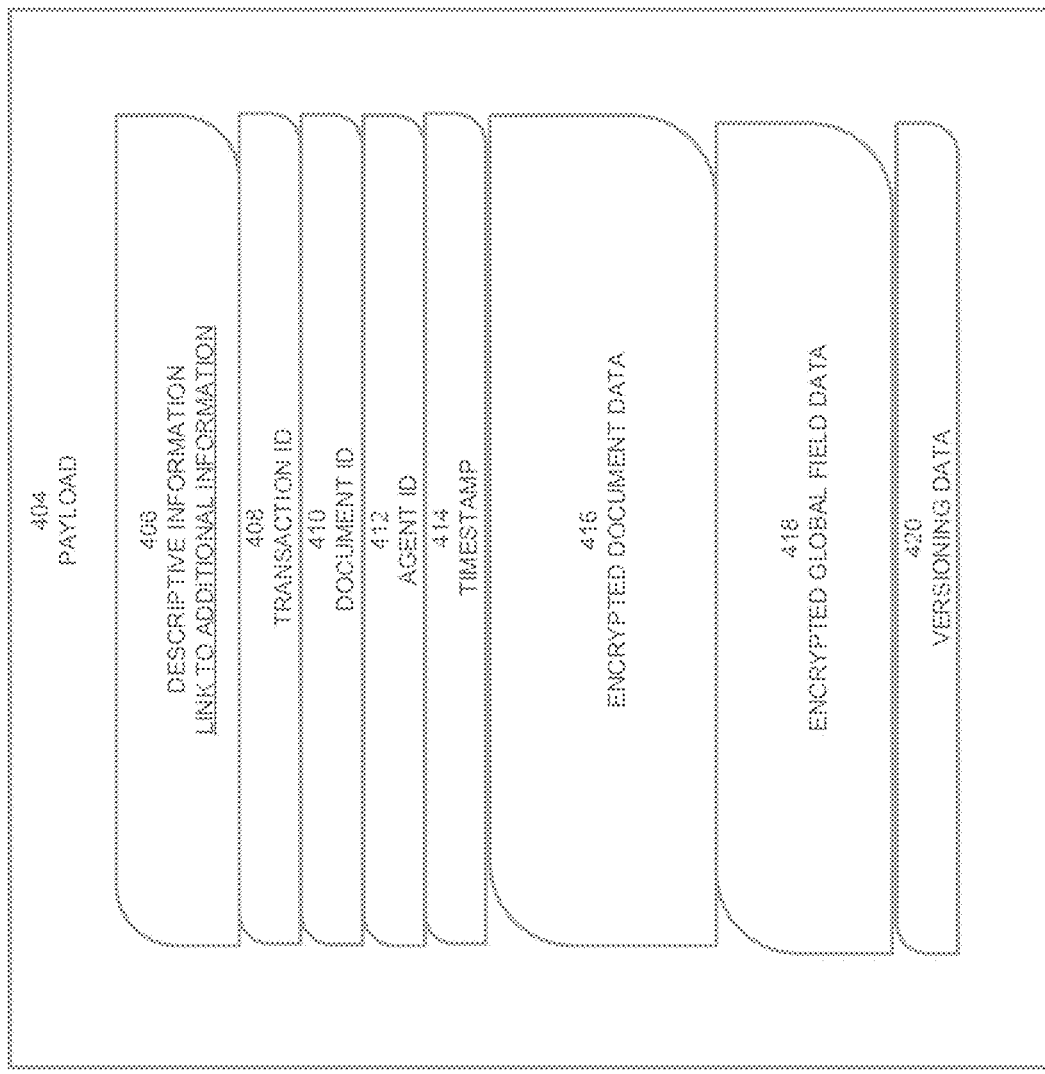
FIG. 4B illustrates example payload file components.

FIG. 4B illustrates the example payload 404 in greater detail. The payload 404 may include all or some of the following data. Descriptive information 406 may include non-encrypted information (e.g., text, graphics, etc.) describing the data included in the payload 404, the document 402 associated with the payload 404, and/or the transaction associated with the document 402. One or more links (e.g., a uniform resource locator or other hyperlink to a network resource) may be provided to updated, additional and/or more detailed information hosted on a remote site (e.g., hosted by the document management system). Thus, the linked-to data may be dynamically updated to reflect changes in state of the transaction corresponding to the document or otherwise, while the data stored in the descriptive information 406 section may remain static. Further, the linked-to data may provide large amounts of information beyond what is included in the descriptive information 406, enabling the descriptive information 406 to remain small, thereby reducing network bandwidth needed to transmit the payload 404 and the amount of memory needed to store the payload 404.

The payload 404 may include, in unencrypted, human readable form, certain properties. The properties may also be embedded in the native document (e.g., in the PDF Custom Properties section of the PDF document 402), viewable via the corresponding document reader (e.g., ADOBE ACROBAT READER). The properties may include a transaction identifier 408 (e.g., in plaintext or optically-coded form), a document identifier 410, an agent identifier 412, and/or a time stamp 414. The transaction identifier 408 is a unique identifier identifying the transaction associated with the document 402. As discussed above, the transaction identifier 408 may be included in a key request to retrieve the corresponding decryption key. The document identifier 410 is a unique identifier of the document. The agent identifier 412 is a unique identifier identifying the account from which the document was generated. The timestamp 414 is the time at which the document 402 and payload 404 were generated.

The document data 416 may include the name-field value tuples of each of the document fields (e.g., text fields, checkboxes, radio buttons, and/or the like). The document data 416 is encrypted and not human readable in this example. The name-field value tuples may be configured to be unambiguous.

The global field data 418 includes the context/general transaction information that may be useful in providing context and in processing the document data 416. Examples of global field/context data are provided elsewhere herein. The global field data 418 is encrypted and not human readable in this example.

Versioning data 420 indicates the version of the encrypted payload format (which indicates the types of data included in the payload 404). The versioning data 420 may be used to inform the decryption service the version of the encrypted payload the decryption service is to decrypt, enabling the decryption service to be resilient in an environment where payload content may be frequently.

Figure 5A:
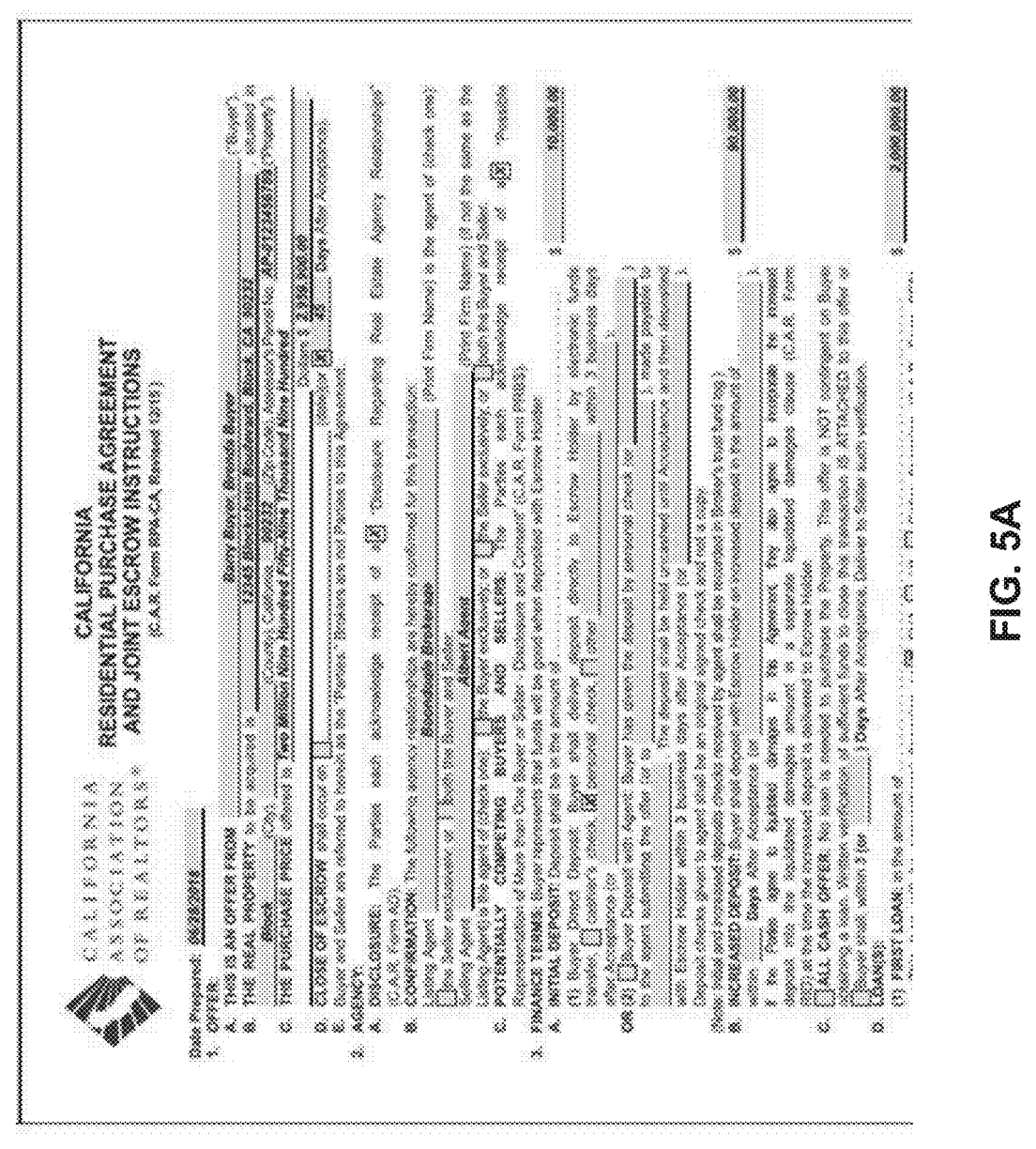
Figure 5B:
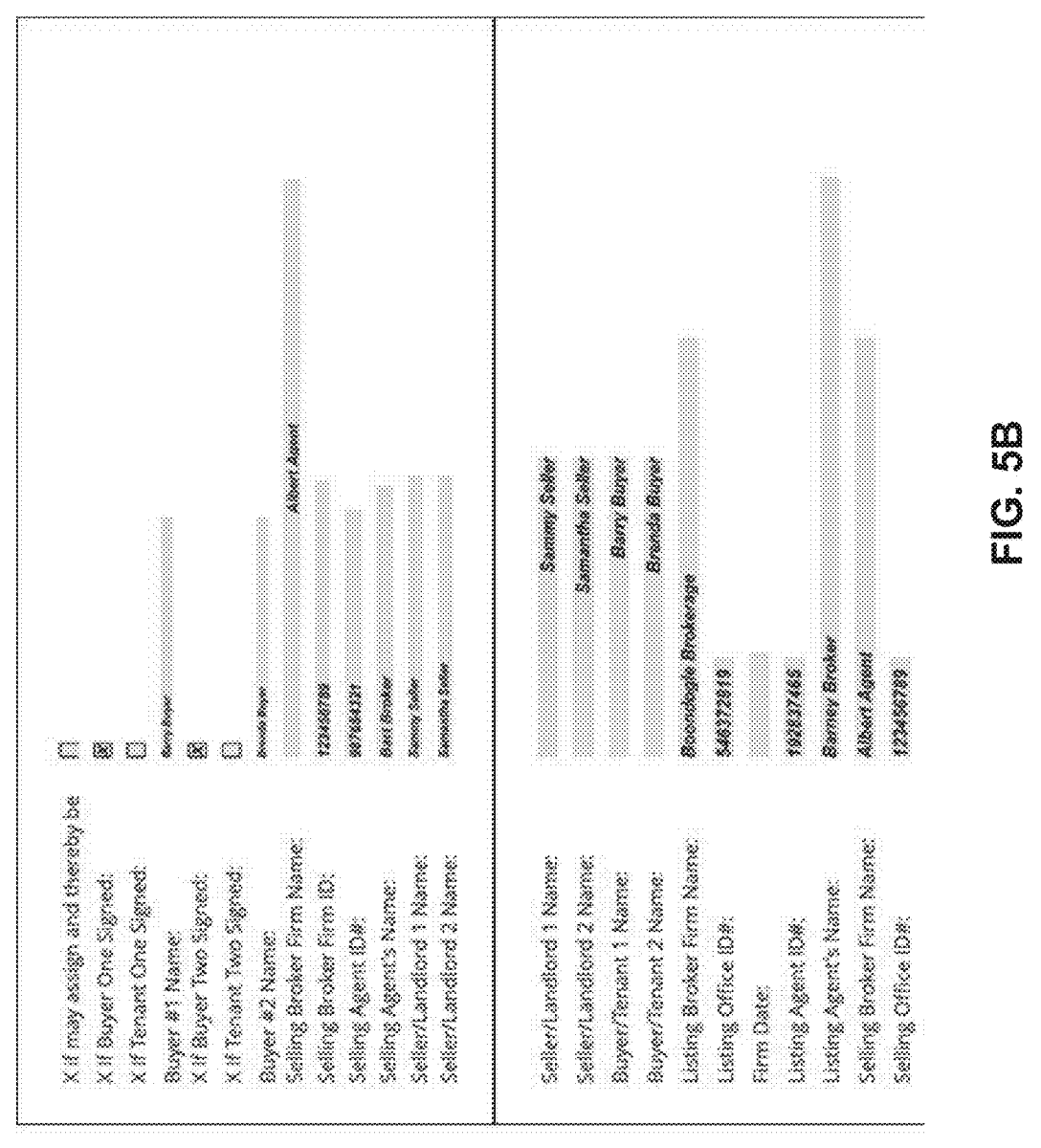
Figure 5C:
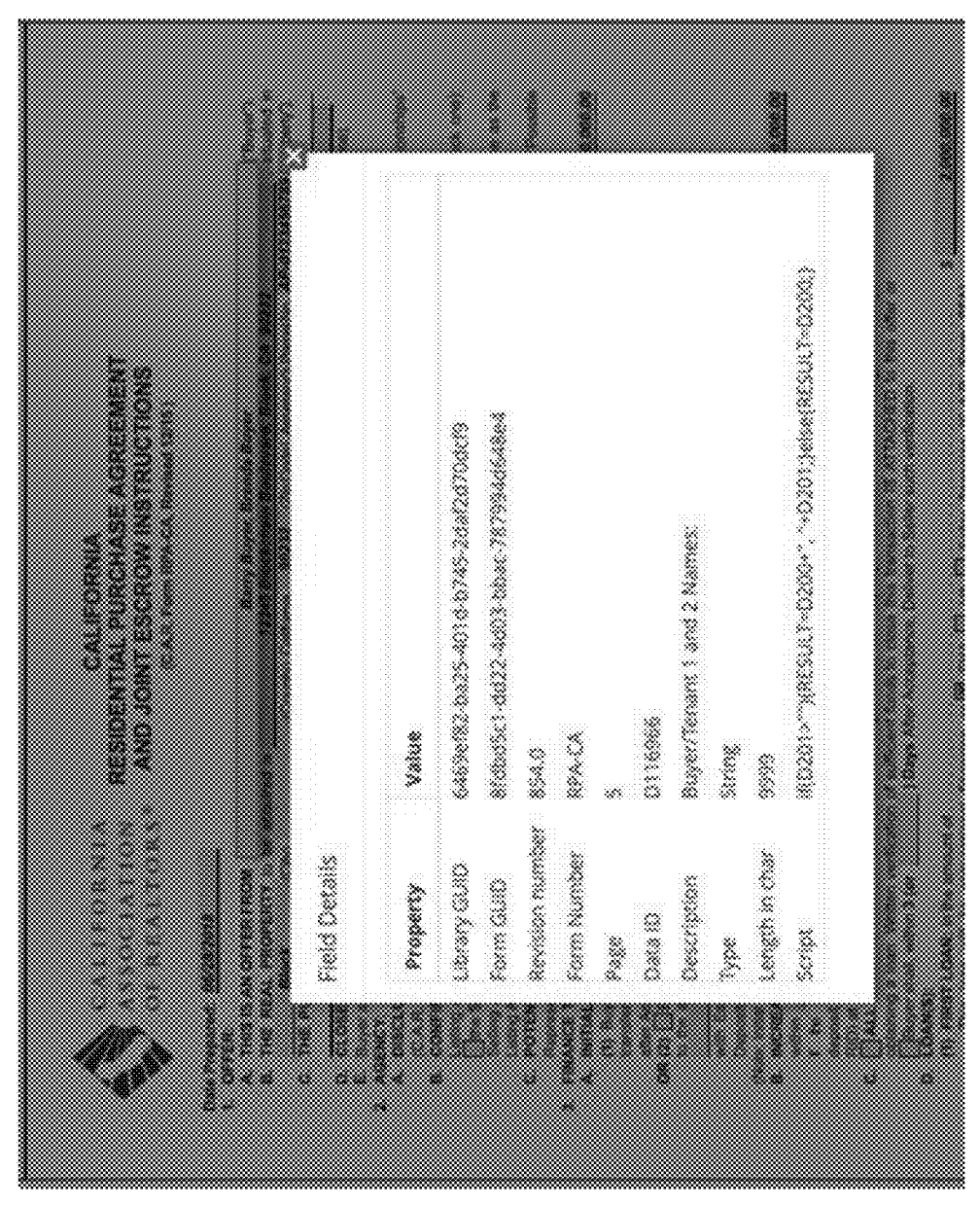

FIGS. 5A-5C illustrate example user interfaces for viewing and/or editing a document and data. A control may be provided by the corresponding application (e.g., installed on the form filler system or the recipient system) that enables the user to control which view is presented. FIG. 5A illustrates an example form whose fields are being filled in (e.g., which text, checks, button activation, as appropriate). In the view depicted in FIG. 5A, all the form content is displayed, such as the form boilerplate (e.g., terms and conditions, branding, etc.), explanatory text, and fields for which the user can enter data.

In the view depicted in FIG. 5B, the display of less necessary content is not displayed. For example, the form boilerplate (e.g., terms and conditions, branding, etc.), explanatory text, and the like are not displayed. The data entry fields are displayed in association with a brief description of the data entry field. The view depicted in FIG. 5B may enable more key-in fields to be displayed at the same of a given size display, making data entry more rapid and reducing the need to scroll through the boilerplate to reach key-in fields.

In the view depicted in FIG. 5C, field details are depicted for a document field selected by the user. Optionally, the field details are displayed as an overlay pop-up over a view of the document (e.g., over the view illustrated in FIG. 5A or 5B). The field details may include a library GUID (Globally Unique Identifier), a form GUID, a revision number, a form number, a page number, a data identifier, a text description, a data type, length in characters, and any associated script.

Thus, described herein are technologies for efficiently facilitating the secure transfer of a document while using the document as a carrier for encrypted data included in a payload. Advantageously, the payload may be accessed and decrypted without requiring specialized, custom applications installed on the receiving client device.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Unless the context indicates otherwise, when the present disclosure refers to transmitting data in unencrypted form, it indicates that the data is not encrypted separate from any encryption that may be formed by nature of the communication channel used for the data transmission. For example, all data being transmitted via a cellular phone may be encrypted as part of the cellular communication standards (e.g., using 64-bit A5/1 encryption, KASUMI block cipher, etc.).

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An authentication and encryption computer system, the authentication and encryption computer system comprising:
   one or more processing devices;
   a network interface;
   non-transitory memory that stores instructions that when executed by the one or more processing devices are configured to cause the computer system to perform operations comprising:
   perform an authentication using at least an identifier associated with an instantiation of a first application hosted on a first user computer system associated with a first user;
   receive a request for a first document over a network via the network interface from the first application hosted on the first user computer system, the first document comprising a form including a plurality of fields configured to receive input data and the first document comprising static text associated with the form;
   provide, over the network via the network interface, the first document to the first application hosted on the first user computer system;
   receive from the first application hosted on the first user computer system:
   the first document including form field input data, wherein the form field input data is associated with respective form field identifiers, and
   context data, the context data comprising textual data separate from data of the first document;
   generate an encryption key;
   encrypt:
   the form field input data and respective form field identifiers as name-field input data sets, wherein at least a portion of the static text, associated with the form included in the first document, is excluded from encryption, and
   the context data;
   receive an indication that a Portable Document Format of the first document is to be provided to a second user computer system, the Portable Document Format including respective depictions of the form field input data;
   provide a Portable Document Format of the first document comprising a payload to the second user computer system, the payload file comprising the encrypted form name-field input data sets, the encrypted context data, and a non-encrypted identifier assigned to the first document and/or a non-encrypted identifier assigned to a transaction associated with the first document, wherein the Portable Document Format of the first document is viewable using a standard Portable Document Format viewer;
   receive a request for a key to decrypt the encrypted form name-field input data sets and the encrypted context data;
   provide the key to decrypt the encrypted form name-field input data sets and the encrypted context data, wherein the decrypted form name-field input data sets and the decrypted context data are viewable using the standard Portable Document Format viewer and/or are computer readable as plaintext.

2. The authentication and encryption computer system as defined in claim 1, wherein the encryption of the document field input data and respective field identifiers as name-field input data sets and the context data is performed using symmetrical encryption and the same key used to perform the symmetrical encryption is used to perform decryption.

3. The authentication and encryption computer system as defined in claim 1, wherein the generation of the encryption key further comprises:
   access a context element associated with the first document; and
   generate the encryption key using at least the context element.

4. The authentication and encryption computer system as defined in claim 1, the operations further comprising:
   receive a plurality of documents and associated respective payload files, from the second user computer system to be decrypted, where the plurality of documents are associated with a first transaction and each of the payload files include a same transaction identifier and at least a portion of the encrypted context data is the same, and respective different document identifiers;
   generate a decryption key using at least a portion of the context data that is the same for each of the plurality of documents; and use the corresponding key to decrypt each of the plurality of documents.

5. The authentication and encryption computer system as defined in claim 1, the operations further comprising:
   access unencrypted version information from the payload file; and
   determine other content of the payload file using the version information.

6. The authentication and encryption computer system as defined in claim 1, wherein the payload file further includes an unencrypted link to a network resource that provides dynamically changing data.

7. The authentication and encryption computer system as defined in claim 1, the operations further comprising:
   provide a plurality of decryption key tokens to an operator of the first user computer system; and
   provide the key to decrypt the encrypted name-field input data sets and the encrypted context data at least partly in response to receiving a first of the decryption key tokens.

8. The authentication and encryption computer system as defined in claim 1, the operations further comprising:
   perform an analysis as to whether the payload file has been tampered with.

9. The authentication and encryption computer system as defined in claim 1, the plurality of fields comprising text entry fields and checkboxes or radio buttons.

10. The authentication and encryption computer system as defined in claim 1, wherein:
    the first document as provided to the first application hosted on the first user computer system is in a first format, and
    the first document as received from the first user computer system is in a second format different than the first format.

11. The authentication and encryption computer system as defined in claim 1, wherein:
    the non-encrypted identifier assigned to the first document and/or the non-encrypted identifier assigned to a transaction associated with the first document are encoded into a computer readable optical code.

12. A system comprising:
   one or more processing devices;
   a network interface;
   non-transitory memory that stores instructions that when executed by the one or more processing devices are configured to cause the computer system to perform operations comprising:
   authenticate a first user, the first user accessing the system using first user computer system;
   provide a first document over a network via the network interface to a first application hosted on the first user computer system, the first document comprising a form including a plurality of fields configured to receive input data and the first document comprising static text;
   receive from the first application hosted on the first user computer system:
      the first document including form field input data, wherein the form field input data is associated with respective form field identifiers, and
      context data, the context data comprising textual data separate from data of the first document;
   generate an encryption key;
   encrypt:
      the document form field input data and respective form field identifiers as name-field input data sets, and
      the context data;
   enable a Portable Document Format of the first document to be provided to a second user computer system, the portable Document Format of the first document comprising a payload file,
   the payload file comprising the encrypted document form name-field input data sets, the encrypted context data, and an item of non-encrypted text associated with the key, wherein the Portable Document Format of the first document is viewable using a standard Portable Document Format viewer;
   receive a request for a key, the request comprising the item of non-encrypted text associated with the key included in the payload;
   use the item of non-encrypted text associated with the key included in the payload to provide the key to the second user computer system, the key configured to decrypt the encrypted form name-field input data sets and the encrypted context data, wherein the decrypted form field input data is viewable using the standard Portable Document Format viewer and/or is computer readable as plaintext.

13. The computer system as defined in claim 12, wherein the encryption of the document field input data and the context data is performed using symmetrical encryption and the same key used to perform the symmetrical encryption is used to perform decryption.

14. The computer system as defined in claim 12, wherein the generation of the encryption key further comprises:
    access a transaction identifier associated with the first document; and
    generate the encryption key using the transaction identifier.

15. The computer system as defined in claim 12, the operations further comprising:
    receive a plurality of documents and associated respective payload files, from the second user computer system to be decrypted, where the plurality of documents are associated with a first transaction and each of the payload files include a same unencrypted item of plaintext;
    use the unencrypted item of plaintext to access or generate a corresponding key; and
    use the corresponding key to decrypt each of the plurality of documents.

16. The computer system as defined in claim 12, the operations further comprising:
    access unencrypted version information from the payload file; and
    determine other content of the payload file using the version information.

17. The computer system as defined in claim 12, wherein the payload file further includes an unencrypted link to a network resource that provides dynamically changing data.

18. The computer system as defined in claim 12, the operations further comprising:
    provide a plurality of decryption key tokens to an operator of the first user computer system; and
    provide the key at least partly in response to receiving a first of the decryption key tokens.

19. The computer system as defined in claim 12, the operations further comprising:
    perform an analysis as to whether the payload file has been tampered with.

20. The computer system as defined in claim 12, wherein the generation of the encryption key is performed using the item of non-encrypted text.

21. The computer system as defined in claim 12, wherein:
the non-encrypted identifier assigned to the first document and/or the non-encrypted identifier assigned to a transaction associated with the first document are encoded into a computer readable optical code.

22. A computer-implemented method comprising:
providing a first document over a network to a first user computer system, the first document comprising a form including a plurality of fields configured to receive input data and the first document comprising static text;
receiving from the first user computer system:
the first document including form field input data, wherein the form field input data is associated with respective form field identifiers, and
context data, the context data comprising textual data separate from data of the first document;
generating an encryption key;
encrypting:
the document form field input data and respective form field identifiers as name-field input data sets, and
the context data;
enabling a payload and an Portable Document Format of the first document to be provided to a second user computer system, the payload comprising the encrypted document form name-field input data sets, the encrypted context data, and an item of non-encrypted text associated with the key, wherein the Portable Document Format of the first document is viewable using a Portable Document Format viewer;
receiving a request for a key, the request comprising the identifier linked to the key;
providing the key to the second user computer system, the key configured to decrypt the encrypted form name-field input data sets and the encrypted context data, wherein the decrypted form field input data is viewable using the Portable Document Format viewer and/or is computer readable as plaintext.

23. The method as defined in claim 22, wherein the encryption of the document field input data and the context data is performed using symmetrical encryption and the same key used to perform the symmetrical encryption is used to perform decryption.

24. The method as defined in claim 22, wherein the generation of the encryption key further comprises:
accessing a transaction identifier associated with the first document; and
generating the encryption key using the transaction identifier.

25. The method as defined in claim 22, the method further comprising:
receiving a plurality of documents and associated respective payloads, from the second user computer system to be decrypted, where the plurality of documents are associated with a first transaction and each of the payloads include a same transaction identifier;
using the transaction identifier to access a corresponding key;
using the corresponding key to decrypt each of the plurality of documents.

26. The method as defined in claim 22, the method further comprising:
accessing unencrypted version information from the payload; and
determining other content of the payload using the version information.

27. The method as defined in claim 22, wherein the payload further includes an unencrypted link to a network resource that provides dynamically changing data.

28. The method as defined in claim 22, the method further comprising:
providing a plurality of decryption key tokens to an operator of the first user computer system; and
providing the key at least partly in response to receiving a first of the decryption key tokens.

29. The method as defined in claim 22, the method further comprising:
performing an analysis as to whether the payload has been tampered with.

30. The method as defined in claim 22, wherein the generation of the encryption key is performed using the item of non-encrypted text.

* * * * *